(12) United States Patent
Lection et al.

(10) Patent No.: US 6,976,211 B2
(45) Date of Patent: Dec. 13, 2005

(54) METHOD, SYSTEM, AND COMPUTER-PROGRAM PRODUCT FOR PROVIDING SELECTIVE ACCESS TO CERTAIN CHILD NODES OF A DOCUMENT OBJECT MODEL (DOM)

(75) Inventors: David B. Lection, Raleigh, NC (US); Eric L. Masselle, Raliegh, NC (US); Yun W. Huang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/911,023

(22) Filed: Jul. 23, 2001

(65) Prior Publication Data

US 2003/0018898 A1 Jan. 23, 2003

(51) Int. Cl.⁷ .............................................. G06F 12/08
(52) U.S. Cl. ......................... 715/514; 713/200; 707/9
(58) Field of Search ............................. 713/201, 200; 707/9; 715/514

(56) References Cited

U.S. PATENT DOCUMENTS

| | | | | |
|---|---|---|---|---|
| 5,745,570 A | * | 4/1998 | Voldal | 713/167 |
| 6,681,221 B1 | * | 1/2004 | Jacobs | 707/5 |
| 6,704,736 B1 | * | 3/2004 | Rys et al. | 707/100 |
| 2001/0047394 A1 | * | 11/2001 | Kloba et al. | 709/217 |
| 2002/0184485 A1 | * | 12/2002 | Dray et al. | 713/150 |

OTHER PUBLICATIONS

Clark et al., "XML Path Language (XPath) Version 1.0", w3c, Nov. 16, 1999, pp. 1-37, obtained from http://www.w3.org/TR/xpath.*
"W3C World Wide Web Consortium; Leading the Web to its Full Potential . . . ," http://www.w3.org, printed Oct. 17, 2001.
W3C Architecture domain; Document Object Model (DOM), http://www.w3.org/DOM, printed Oct. 17, 2001.

* cited by examiner

*Primary Examiner*—Emmanuel L. Moise
*Assistant Examiner*—Jeffrey Popham
(74) *Attorney, Agent, or Firm*—Synnestvedt & Lechner LLP; Stephen Calogero, Esq.

(57) ABSTRACT

A unique method, system, and computer-program product for providing selective access to (and selective exclusion from) certain nodes of a DOM tree is disclosed. Each DOM node is provided with a naming mechanism; in a preferred embodiment each node is assigned a permanent name using an XML attribute NAME to identify each node, and each node is also assigned a "context state value" using an XML attribute "CONTEXT". Changes to the operating context of the DOM tree affect the accessibility of each node in the tree. By correlating the "CONTEXT" attribute of a child node (or nodes) to the "CONTEXT" attribute of a parent node, the correlated child node is accessible by the parent.

10 Claims, 10 Drawing Sheets

```
<CUSTOMER>
    <LAST-NAME>Jones</LAST-NAME> <
    FIRST-NAME>David</FIRST-NAME> <
    ADDRESS>
        <STREET>8008 Greely Ct.</STREET> <
        CITY>Anytown</CITY> <
        STATE>Virginia</STATE> <
        ZIPCODE>12345</ZIPCODE>
    </ADDRESS>
</CUSTOMER>
```

```
<BOOK NAME="USERGUIDE" CONTEXT="NOVICE">
  <CHAPTER1 NAME="EASY HELP" CONTEXT="NOVICE">
    <PAGE NAME="PAGE1"/>
    <PAGE NAME="PAGE2"/>
  </CHAPTER1>
  <CHAPTER2 NAME="ADVANCED HELP" CONTEXT="EXPERT">
    <PAGE NAME="PAGE3"/>
    <PAGE NAME="PAGE4"/>
  </CHAPTER2>
</BOOK>
```

FIG. 5C

```
<BOOK NAME="USERGUIDE" CONTEXT="NOVICE">
 <CHAPTER1 NAME="EASY HELP" CONTEXT="NOVICE">
  <PAGE NAME="PAGE1"/>
  <PAGE NAME="PAGE2"/>
 </CHAPTER1>
</BOOK>
```

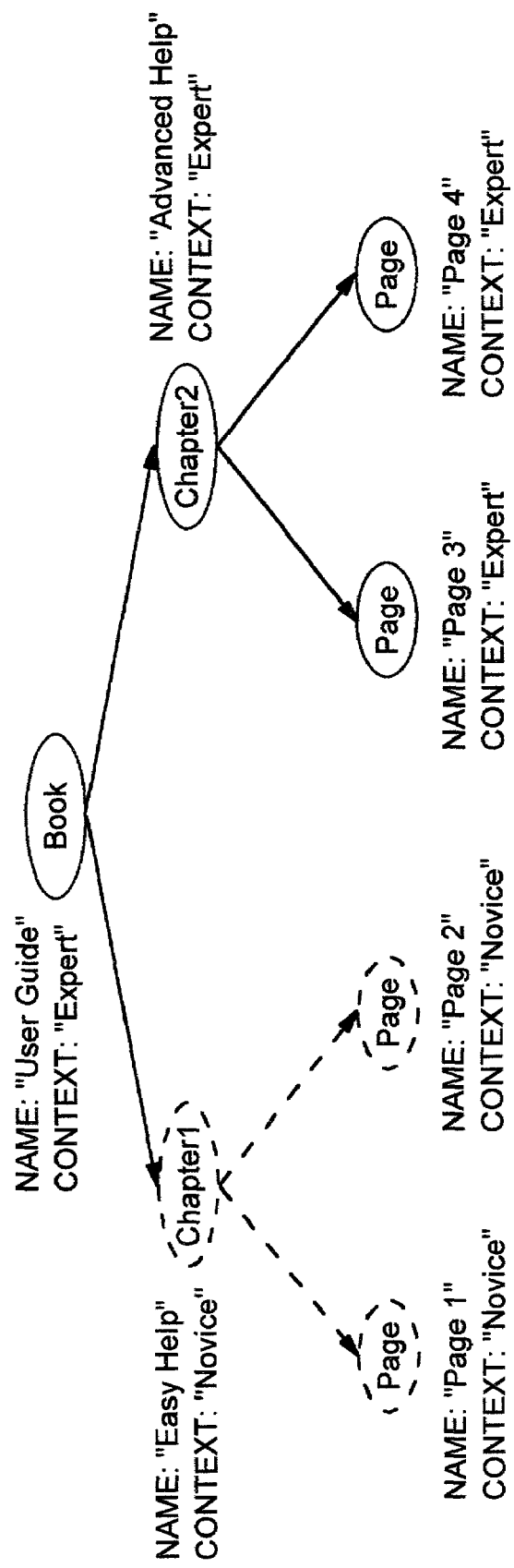

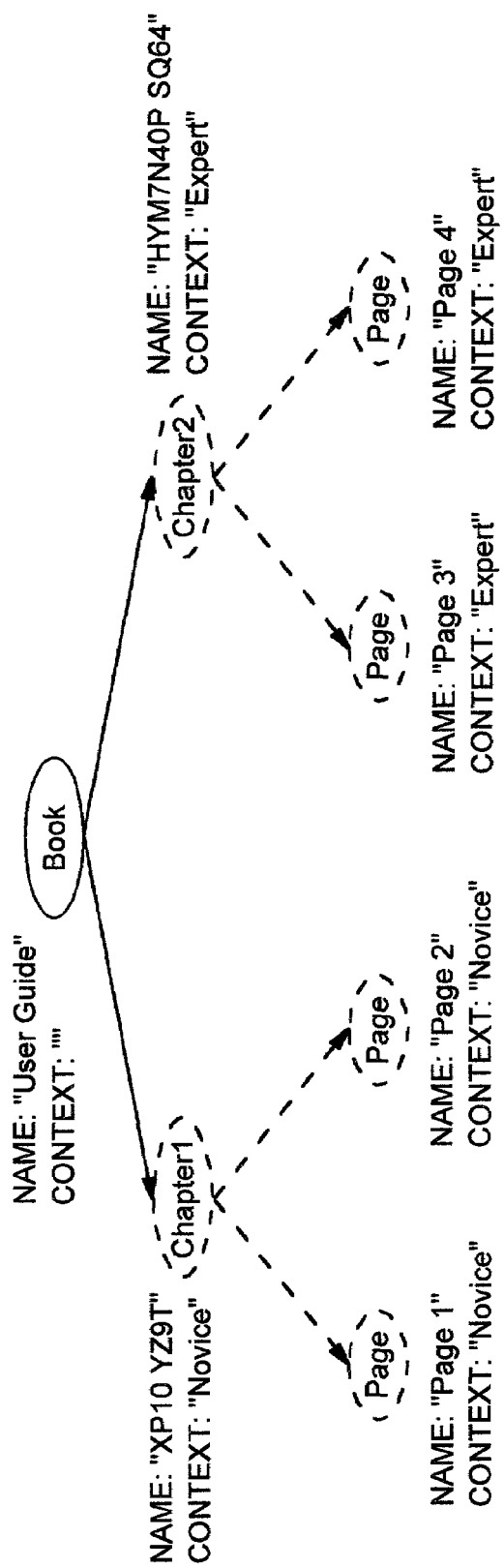

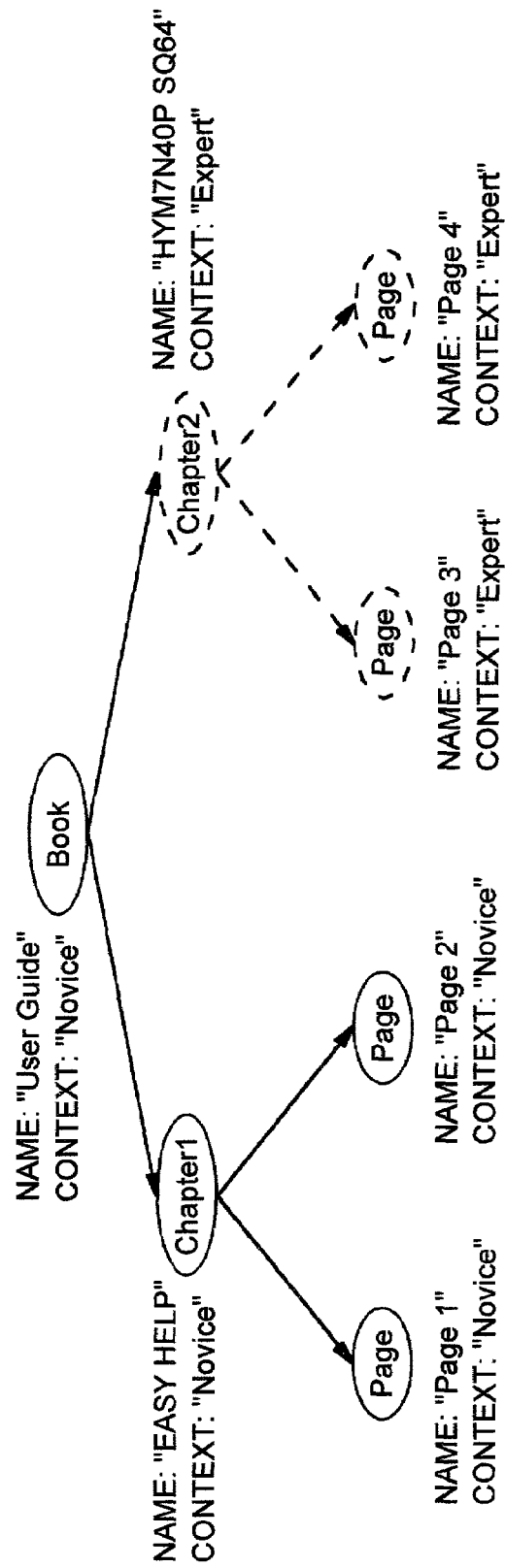

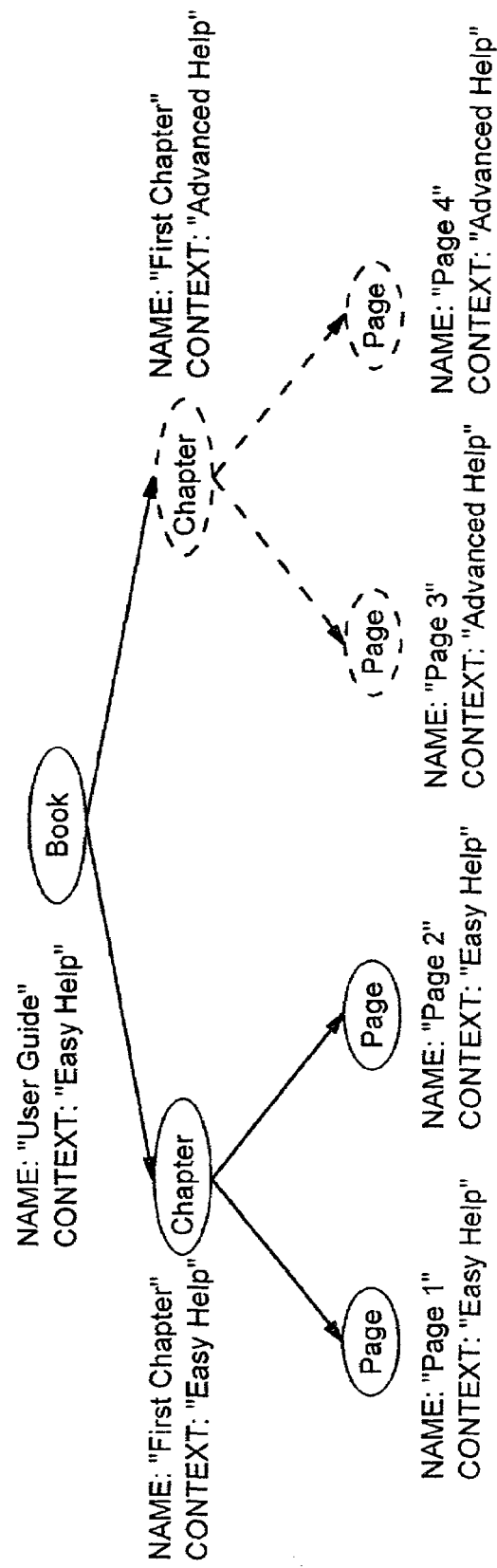

METHOD, SYSTEM, AND COMPUTER-PROGRAM PRODUCT FOR PROVIDING SELECTIVE ACCESS TO CERTAIN CHILD NODES OF A DOCUMENT OBJECT MODEL (DOM)

BACKGROUND OF THE INVENTION

1. Field of the Invention

The present invention relates to the field of XML documents and, more particularly, to a method, system, and computer-program product for providing selective access to certain child nodes of a Document Object Model (DOM).

2. Discussion of the Related Art

The use of Extensible Markup Language (XML) is very popular in the development of software applications. Originally XML was used primarily for the exchanging of data between two applications, but XML is now applied to almost every aspect of a software application where easy declaration of data structures and customization of data are required.

When an XML document is read and parsed, the output of the parsing process is a tree structure called a Document Object Model, otherwise known as a DOM tree. The DOM tree is simply a tree-like structure providing a visual representation of the hierarchy of an XML document, where each node of the tree represents an XML tag.

FIG. 1A is an example of a small section of XML text and FIG. 1B illustrates a DOM tree corresponding to the XML text of FIG. 1A.

When parsed, the XML text of FIG. 1A will result in the DOM tree of FIG. 1B. As can be seen, the DOM tree consists of several nodes: "Customer"; "Last-Name"; "First-Name"; "Address"; "Street"; "City"; "State"; and "Zipcode", and each node may have "children". For example, the node "Customer" is a parent node to three children: "Last-Name", "First-Name", and "Address". Similarly, the node "Address" is a parent node to four children: "Street", "City", "State", and "Zipcode".

Each node typically is an instance of an object and there are executable methods that may be performed on each node. For example, if the method "getChildNodes( )" is called on the "Customer" node of FIG. 1A, a list is compiled containing the nodes (Last-Name, First-Name, and Address). A node may also have a text value, which may be retrieved using the method "getNodeValue( )". Thus, if the "Street" node contains the value "8008 Greely Court", then calling "getNodeValue( ) on the "Street" node will retrieve (8008 Greely Court).

The World Wide Web Consortium has developed a standard framework and API that defines access to the nodes of a DOM Tree (see http://www.w3c.org for further information and a complete discussion of the API and framework). The w3c DOM API allows the children to be searched, enumerated (to enable retrieval of contents, the formulation of lists of children, and the like), and in some high performance DOM implementations a child node may be looked up by the value of an attribute (which allows a program to access the contents of a DOM in any contextual manner).

Under the DOM standard of the prior art, there is no way to restrict access to certain of the child nodes while allowing access to others; it is an all-or-nothing proposition. Thus, under the DOM standard of the prior art, restricted access selectively among nodes (to allow, for example, limited access to nodes that have sensitive information or nodes that have contextual data which could only be accessed if the system is set to operate in that context) cannot be facilitated.

Accordingly, it would be desirable to have a DOM in which the DOM nodes are enhanced to provide XOR access, that is, where the DOM nodes can be identified by a particular value and where only those nodes that match a selected one of these values will be "visible" at any point in time.

SUMMARY OF THE INVENTION

The present invention provides a unique method, system, and computer-program product for providing selective access to (and selective exclusion from) certain nodes of a DOM tree. Each DOM node is provided with a naming mechanism; in a preferred embodiment each node is assigned a permanent name using an XML attribute NAME to identify each node, and each node is also assigned a "context state value" using an XML attribute "CONTEXT". Changes to the operating context of the DOM tree affect the accessibility of each node in the tree. By correlating the "CONTEXT" attribute of a child node (or nodes) to the "CONTEXT" attribute of a parent node, the correlated child node is accessible by the parent.

BRIEF DESCRIPTION OF THE DRAWINGS

FIG. 5C illustrates the "effective" XML tagging of the DOM tree of FIG. 5B;

FIG. 6A is a DOM tree illustrating an alternate configuration of the DOM tree of FIGS. 5A–5C, and FIG. 6B illustrates XML tagging corresponding to the DOM tree of FIG. 6A;

FIG. 7A illustrates XML tagging for an example showing the "encryption method" in accordance with the present invention, and FIG. 7B is a DOM tree corresponding to the XML tagging of FIG. 7A;

FIG. 8A is an example of the effective XML text of an alternate configuration of the DOM tree of FIG. 7A–7B, and FIG. 8B is a DOM tree corresponding to the XML text of FIG. 8A; and FIG. 9A is a textual representation of the XML tagging for an alternative embodiment of the present invention, and FIG. 9B is a DOM tree described by the XML text of FIG. 9A.

DETAILED DESCRIPTION OF THE PREFERRED EMBODIMENTS

Figures 1A, 1B:
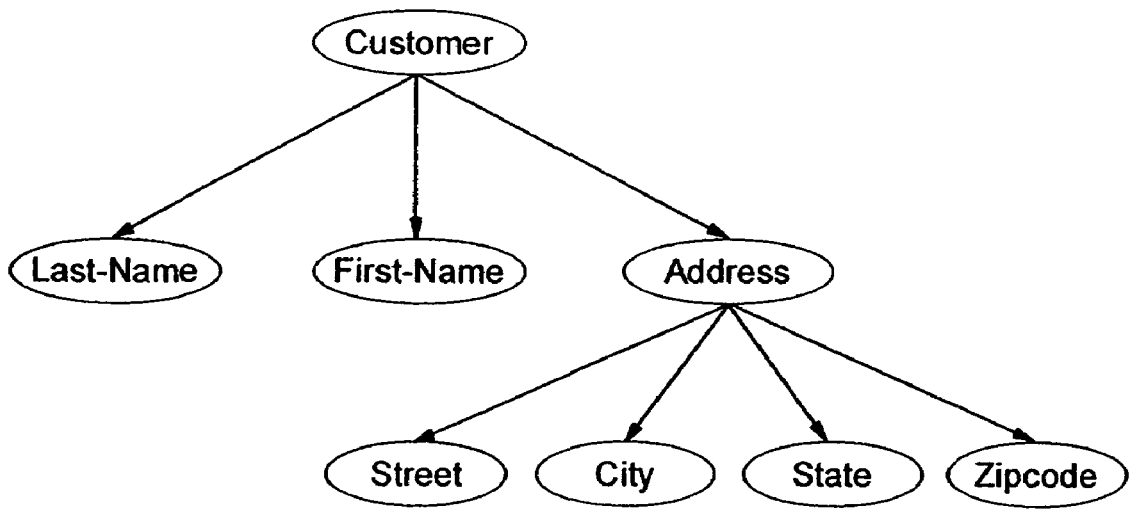
FIG. 1A illustrates an example of a DOM tree and FIG. 1B is an example of a small section of XML text corresponding to the DOM tree of FIG. 1A.

In the drawings, the same reference numerals are used to indicate the same elements.

Figure 2:
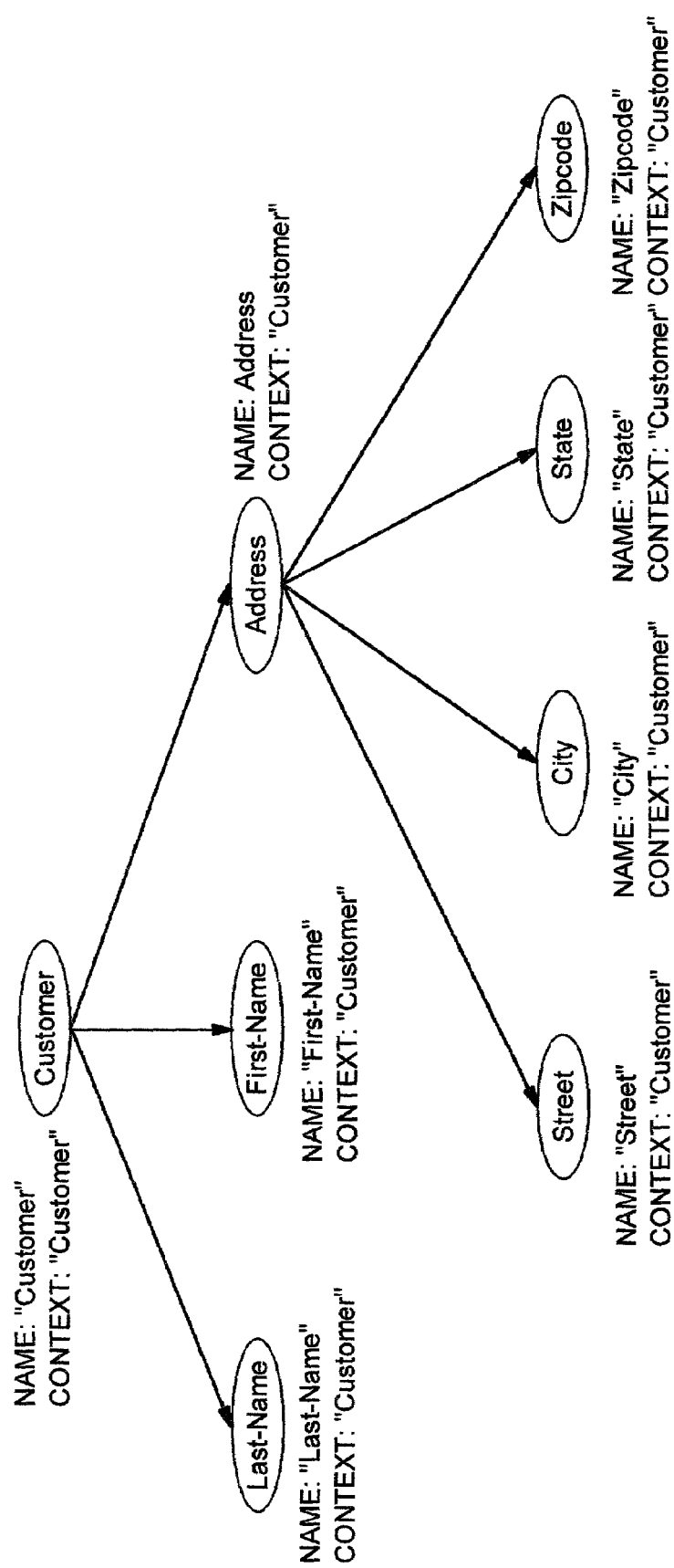
FIG. 2 is a DOM tree configured in accordance with the present invention.

FIG. 2 is a DOM tree configured in accordance with the present invention. In FIG. 2, the CONTEXT value for each node is identical, i.e., "Customer". When the CONTEXT value for each node is identical, the DOM tree operates identically to the prior art DOM tree illustrated in FIG. 1, that is, all nodes in the tree are accessible.

Figure 3:
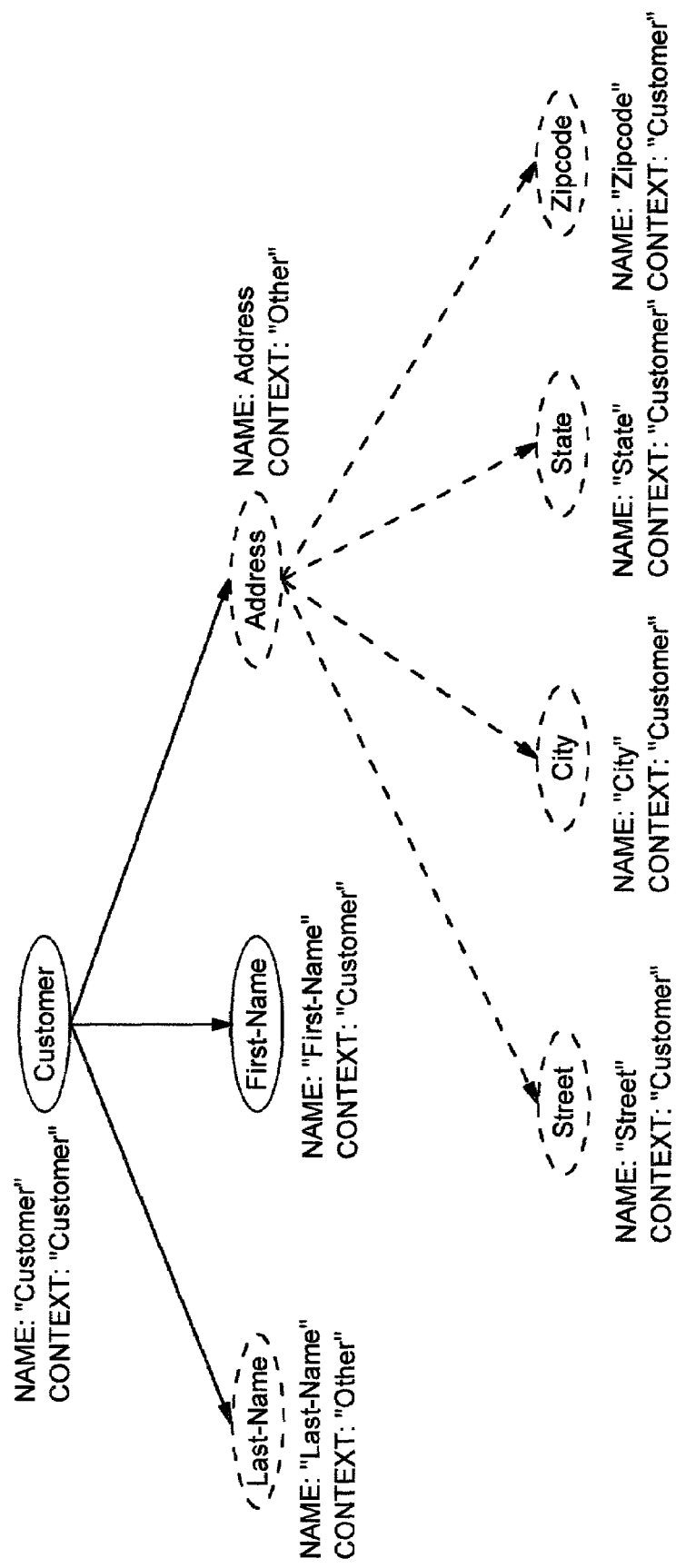
FIG. 3 is a DOM tree illustrating the DOM tree of FIG. 2, but showing the effect of correlating CONTEXT nodes in accordance with the present invention.

FIG. 3 is a DOM tree identical to the DOM tree of FIG. 2, except that, in FIG. 3, the "Last-Name" node and the "Address" node have their CONTEXT values set to "Other" instead of "Customer". In accordance with the present invention, only the children nodes of a parent node (e.g., the "Customer" node) having a CONTEXT value the same as the parent node are visible (i.e., accessible); the other nodes (in this example, the "Last-Name" and "Address" nodes) are hidden (i.e., inaccessible). Further, in accordance with the present invention, the "grandchild" nodes ("Street", "City", "State", and "Zipcode") are also hidden, since they are hidden by their parent (the "Address" node); their CONTEXT value is immaterial in such a case.

In each of the above examples, the child nodes are accessible when their CONTEXT value or attribute is identical to that of their parent; this relationship is referred to herein as a "correlation" between the CONTEXT of the parent and the CONTEXT of the children, and a child node so correlated is referred to herein as a "correlated node."

Figure 4:
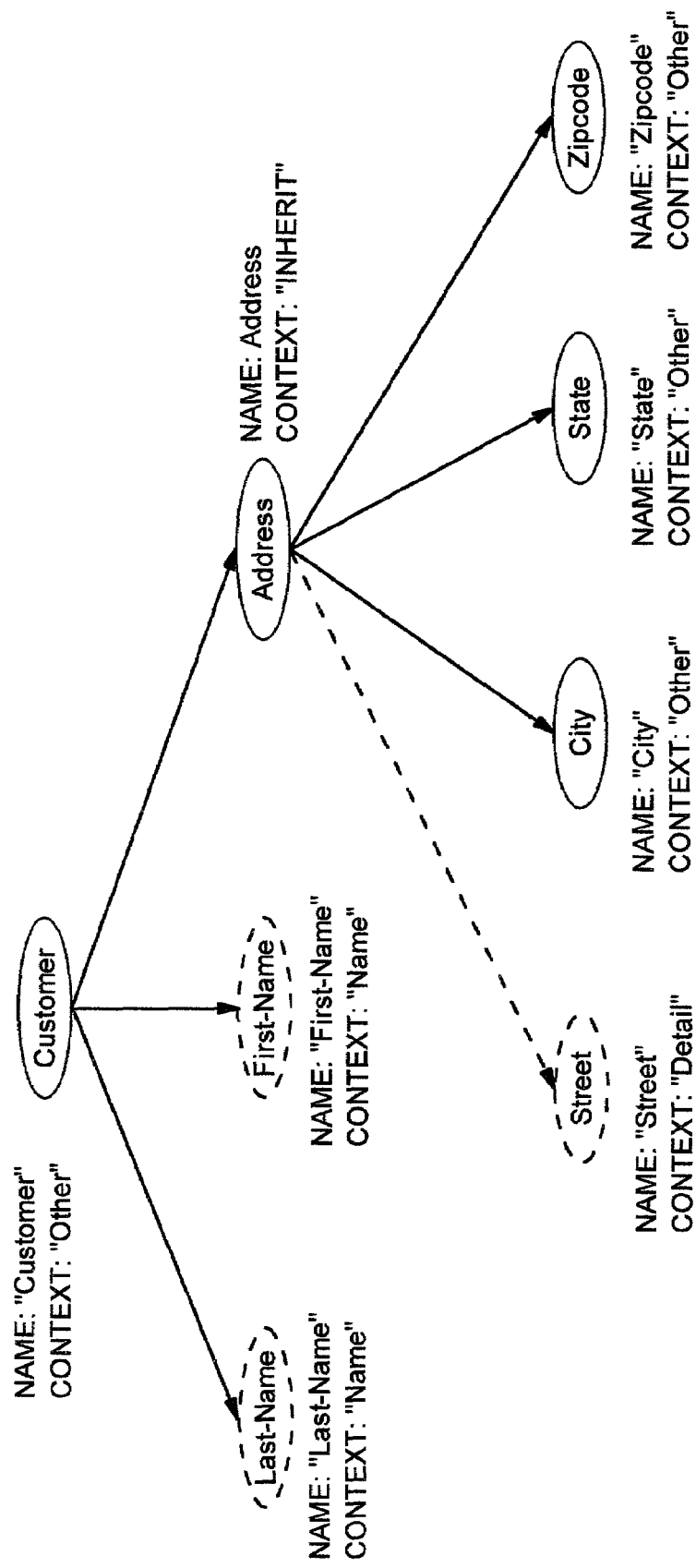
FIG. 4 illustrates a preferred embodiment which introduces a CONTEXT attribute value entitled the "INHERIT" value.

While in the above example the correlated nodes are assigned the identical CONTEXT value as that of their parent, it is not necessary that the CONTEXT values be identical for the correlation to exist. FIG. 4 illustrates an alternative embodiment which introduces a new CONTEXT attribute value entitled the "INHERIT" value. The INHERIT value of a child DOM node instructs the child DOM node to adopt the CONTEXT attribute value of its parent DOM node. Thus, the parent's value for the CONTEXT attribute will determine which of its children and grandchildren, etc. to hide or allow access to. Referring to FIG. 4, it can be seen that "City", "State", and "Zipcode" have the CONTEXT tag "Other"; the "Street" node has the CONTEXT tag "Detail"; the "Last-Name" and "First-Name" nodes have the CONTEXT tag "Name"; the "Address" node has the CONTEXT tag "INHERIT"; and the parent node "Customer" has the CONTEXT tag "Other".

Using the above-described operations, the "Last-Name" and First-Name" nodes will be hidden, since neither has a CONTEXT tag matching that of their parent node "Customer". However, since the "Address" node has the CONTEXT tag "INHERIT", it takes on (inherits) the CONTEXT tag of its parent, and thus takes on the CONTEXT tag "Other". Thus, the "Address" node is a correlated node, correlated to parent node "Customer." This leads to the hiding of the "Street" node (since its CONTEXT tag≠"Other") and to the availability of the "City", "State", and "Zipcode" nodes (since their CONTEXT tags="Other"). In other words, the "City", "State", and "Zipcode" nodes are correlated to the "Address" node and also to the "Customer" node. Within the structure of a DOM tree utilizing the teachings of the present invention, several nodes within a descendant path in the DOM tree may take on the CONTEXT attribute value of "INHERIT" thereby enabling all nodes in the path to have their CONTEXT attribute controlled by the CONTEXT attribute value of the highest ascendent node in the path (the parent node "Customer" in this example).

The present invention teaches novel methods for restricting access to nodes based on context. The actual methods for restricting (or allowing) access to the nodes can be any of several methods; the novelty lies in evaluating the context of the nodes and using this evaluation as the basis for node restriction. For example, a node could simply be made unavailable when it does not possess the context of its parent, e.g., by saving a reference to the node in a private area of the parent node. Alternatively, all data for nodes to be hidden could be encrypted; thus, while the data itself would be "accessible" it could not be understood and thus could not be used for any purpose. Further, instead of encrypting data when it is determined to be inaccessible, all data could be encrypted whenever a child is added to the tree, and when the CONTEXT tag was to allow access to a node, only then would the data be decrypted. The methods for making a node inaccessible to a parent node, and for encrypting data for a node, are well-known in the art; however, selective inaccessibility or encryption of nodes based on a CONTEXT value or other similar criteria is novel.

The following examples illustrate various aspects of the present invention. For the purpose of these examples, assume that there is a user's manual written in XML, and one half of the manual is a section named "Novice" which contains help information on pages 1 and 2 for a novice user, and a second section is called "Expert" which contains help information on pages 3 and 4 aimed at a more experienced (i.e. expert) user. Note that the portions of the DOM tree illustrated in broken lines indicates hidden (i.e., inaccessible and/or encrypted) nodes.

EXAMPLE 1

Figures 5A, 5B:
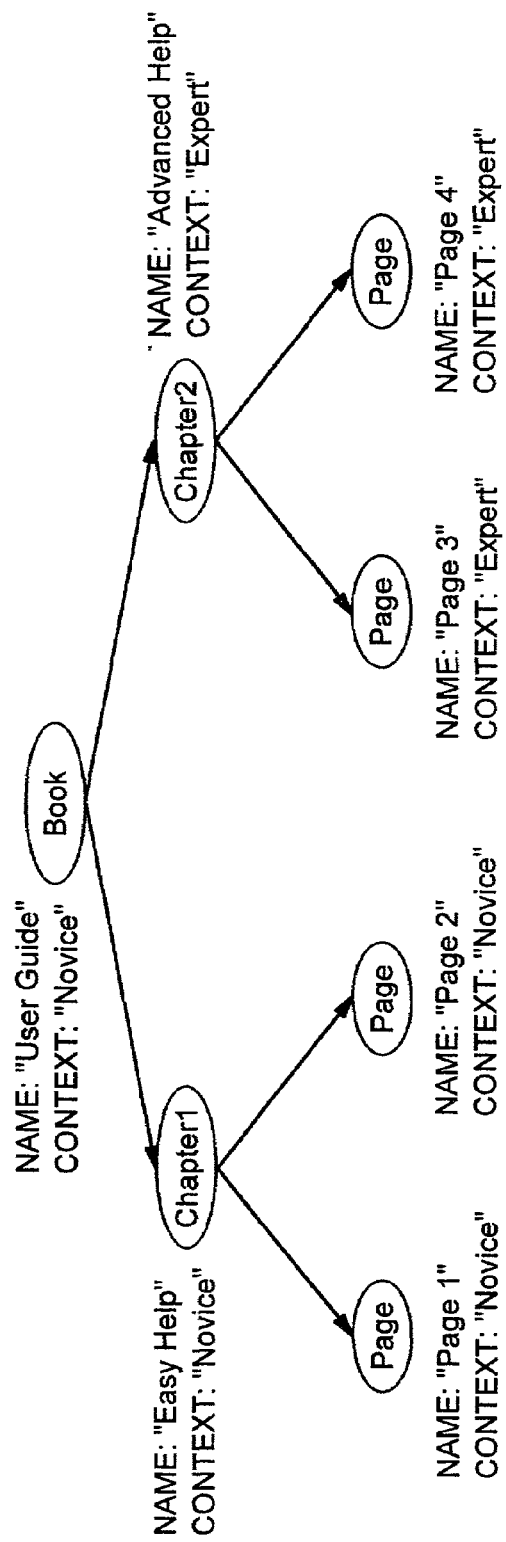
FIG. 5A is a textual representation of the XML tagging for a first example illustrating the present invention.
FIG. 5B is a DOM tree representing the XML tagging of FIG. 5A.

The first example illustrates the basic operation of the CONTEXT tags. The textual representation of the XML tagging for this example is shown in FIG. 5A. FIG. 5B is a DOM tree representing the XML tagging of FIG. 5A. In the DOM tree of FIG. 5B, the CONTEXT tag for the parent node (UserGuide) is set to "Novice". Accordingly, the "effective" DOM tree would be only the Novice branch of the tree, corresponding to the "Easy Help" chapters, and the effective XML tagging would be as shown in FIG. 5C.

Alternatively, if it was desired to allow access to only the "Advanced Help" chapters, the CONTEXT tag for the parent node could be set to "Expert" as shown in the DOM tree of FIG. 6A; this would cause the "effective" DOM to be only the "Expert" branch of the tree, corresponding to the "Advanced Help" chapters, as shown by the XML tagging illustrated in FIG. 6B.

EXAMPLE 2

In this example, the encryption method is illustrated. Here, the name of each Chapter is encrypted when the node is added, so that the text version of the DOM tree appears as shown in FIG. 7A, with a corresponding DOM tree as shown in FIG. 7B. Note that since the CONTEXT value is left blank and the nodes of the branches are not, the entire DOM tree is inaccessible. If the <BOOK> tag is set for NOVICE, the effective XML text of the DOM tree for this text would be as shown in FIG. 8A, with a corresponding DOM tree as shown in FIG. 8B.

In this example, when a child node with a given name and context value is added to the DOM tree, the values of any data fields in the node are encrypted. The encryption key is selected to be a private formula based on context and name, but not merely on the context and name values, so that attempts to decrypt with these values directly in any way will fail. Access to all children nodes is allowed at all times, but only the nodes that match the current context value of the parent node will be decrypted, rendering the data values in those nodes accessible and useable. When the context value of a node is changed, then the children list that matches the context is decrypted. Children nodes that are encrypted also hide their children to maintain the security of child descendant data. So by using the encryption method, all nodes are "accessible", only those nodes with decrypted data will be useable.

EXAMPLE 3

In this example, two nodes with the same name are used. While under the previously described examples, having two nodes with the same name would be considered an illegal action, by setting the context of the parent node to the same context as one of the child nodes, and by requiring that none of the child nodes share an identical context, only the node having the same context as the parent node will be available. In other words, the value of the context attribute of the parent node determines which single child node is available. This can be beneficial to cover instances where, for example, the same name is used for different nodes to facilitate searching or filtering, but where it is still desirable to be able to selectively access one node branch to the exclusion of all others.

FIG. 9A is a textual representation of the XML tagging for the above-described example, and FIG. 9B is a DOM tree described by the XML text of FIG. 9A. In this example, since the context of the parent node, named "User Guide" is "Easy Help", only the left side, i.e., the node named "First Chapter" also having the context "Easy Help" is available, thereby giving access only to nodes "Page 1" and "Page 2". By changing the context of the node named "User Guide" to "Advanced Help", access to the left node will be denied and access to the right node will now be allowed, thereby giving access to advanced help page 3 and page 4. This example thus illustrates how sibling nodes of the same name can be hidden or shown based on their context value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method of controlling access by a parent node to child nodes in a DOM tree corresponding to a data file, comprising the steps of:

assigning a parent-node context-value to said parent node, said parent-node context-value being stored as character information in the data file;

assigning a child-node context-value to each of said child nodes, said parent-node context-value being stored as character information in the data file;

correlating one or more of said child nodes to said parent node, said correlating step comprising at least assigning the child-node context-value of said correlated child nodes to be the same as the parent-node context value; and permitting access by said parent node only to said correlated child nodes;

wherein each of said parent node and said child nodes is assigned a name, said name being stored as character information in the data file, and wherein each of the names assigned to said child nodes is encrypted at the time it is assigned, and wherein said step of permitting access comprises at least the step of:

decrypting the names of each correlated child node.

2. A method as set forth in claim 1, wherein said correlating step comprises at least the step of:

assigning the child-node context-value of said correlated child nodes to inherit the parent-node context value.

3. A method as set forth in claim 1, wherein each of said child nodes is assigned a child-node context-value which is unique with respect to the child-node context-value of all other child nodes, and wherein only one of said child nodes is correlated to said parent node, said correlating step comprising at least the step of:

assigning the child-node context-value of said correlated child-node to be the same as the parent-node context-value.

4. A system for controlling access by a parent node to child nodes in a DOM tree corresponding to a data file, comprising:

means for assigning a parent-node context-value to said parent node, said parent-node context-value being stored as character information in the data file;

means for assigning a child-node context-value to each of said child nodes, said parent-node context-value being stored as character information in the data file;

means for correlating one or more of said child nodes to said parent node, wherein said means for correlating comprises at least means for assigning the child-node context-value of said correlated child nodes to be the same as the parent-node context value; and means for permitting access by said parent node only to said correlated child nodes;

wherein each of said parent node and said child nodes is assigned a name, said name being stored as character information in the data file, and wherein each of the names assigned to said child nodes is encrypted at the time it is assigned, and wherein said means for permitting access comprises at least:

means for decrypting the names of each correlated child node.

5. A system as set forth in claim 4, wherein said means for correlating comprises at least:

means for assigning the child-node context-value of said correlated child nodes to inherit the parent-node context value.

6. A system as set forth in claim 4, wherein each of said child nodes is assigned a child-node context-value which is unique with respect to the child-node context-value of all other child nodes, and wherein only one of said child nodes is correlated to said parent node, said means for correlating comprising at least:

means for assigning the child-node context-value of said correlated child-node to be the same as the parent-node context-value.

7. A computer program product for controlling access by a parent node to child nodes in a DOM tree corresponding to a data file, comprising:

computer-readable program code embodied in a computer-readable storage medium, said computer-readable program code comprising:

computer-readable program code configured to assign a parent-node context-value to said parent node, said parent-node context-value being stored as character information in the data file;

computer-readable program code configured to assign a child-node context-value to each of said child nodes, said parent-node context-value being stored as character information in the data file;

computer-readable program code configured to correlate one or more of said child nodes to said parent node, wherein said computer-readable program code configured to correlate one or more of said child nodes to said parent node comprises at least computer-readable program code configured to assign the child-node context-value of said correlated child nodes to be the same as the parent-node context value; and computer-readable program code configured to permit access by said parent node only to said correlated child nodes;

wherein each of said parent node and said child nodes is assigned a name, said name being stored as character information in the data file, and wherein each of the names assigned to said child nodes is encrypted at the time it is assigned, and wherein said computer readable program code configured to permit access by said parent node only to said correlated child nodes comprises at least:

computer-readable program code configured to decrypt the names of each correlated child node.

8. A computer program product as set forth in claim 7, wherein said computer-readable program code configured to correlate one or more of said child nodes to said parent node comprises at least:

computer-readable program code configured to assign the child-node context-value of said correlated child nodes to inherit the parent-node context value.

9. A computer program product as set forth in claim 7, wherein each of said child nodes is assigned a child-node context-value which is unique with respect to the child-node context-value of all other child nodes, and wherein only one of said child nodes is correlated to said parent node, said computer-readable program code configured to correlate one or more of said child nodes to said parent node comprising at least:

computer-programmable program code configured to assign the child-node context-value of said correlated child-node to be the same as the parent-node context-value.

10. A computer-implemented method of controlling access by a parent node to child nodes in a DOM tree corresponding to a data file, comprising the steps of:

assigning a parent-node context-value to said parent node, said parent-node context-value being stored as character information in the data file;

assigning a child-node context-value to each of said child nodes, said parent-node context-value being stored as character information in the data file;

assigning each of said parent node and said child nodes a respective name;

encrypting each of said respective names;

storing said encrypted respective names as character information in the data file, correlating one or more of said child nodes to said parent node by assigning the child-node context-value of said correlated child nodes to be the same as the parent-node context value; and permitting access by said parent node only to said correlated child nodes, said permitting access including decrypting the names of each correlated child node.

* * * * *